US010558048B2

(12) United States Patent
Fukuda et al.

(10) Patent No.: US 10,558,048 B2
(45) Date of Patent: Feb. 11, 2020

(54) IMAGE DISPLAY SYSTEM, METHOD FOR CONTROLLING IMAGE DISPLAY SYSTEM, IMAGE DISTRIBUTION SYSTEM AND HEAD-MOUNTED DISPLAY

(71) Applicant: MELEAP INC., Tokyo (JP)

(72) Inventors: Hiroshi Fukuda, Tokyo (JP); Hitoshi Araki, Tokyo (JP); Takuma Motoki, Tokyo (JP); Naoki Ota, Tokyo (JP); Tsuyoshi Takeuchi, Tokyo (JP)

(73) Assignee: MELEAP INC., Tokyo (JP)

( * ) Notice: Subject to any disclaimer, the term of this patent is extended or adjusted under 35 U.S.C. 154(b) by 0 days.

(21) Appl. No.: 16/070,096

(22) PCT Filed: Feb. 16, 2016

(86) PCT No.: PCT/JP2016/054459
§ 371 (c)(1),
(2) Date: Jul. 13, 2018

(87) PCT Pub. No.: WO2017/122367
PCT Pub. Date: Jul. 20, 2017

(65) Prior Publication Data
US 2019/0025595 A1    Jan. 24, 2019

(30) Foreign Application Priority Data

Jan. 15, 2016    (JP) .................................. 2016-006653

(51) Int. Cl.
*G02B 27/01*    (2006.01)
*G06F 3/01*    (2006.01)
(Continued)

(52) U.S. Cl.
CPC ..... *G02B 27/0172* (2013.01); *G02B 27/0176* (2013.01); *G06F 1/163* (2013.01);
(Continued)

(58) Field of Classification Search
CPC ...... G06F 3/011; G06F 3/012; G06F 3/04815; G06F 1/163; G06F 3/01; G06F 3/0346;
(Continued)

(56) References Cited

U.S. PATENT DOCUMENTS 6,278,418 B1 *    8/2001  Doi ....................... G09G 3/002
                                                       345/156
6,522,312 B2 *    2/2003  Ohshima ................ A63F 13/00
                                                          345/8

(Continued)

FOREIGN PATENT DOCUMENTS

EP        1060772 A2    12/2000
JP     2000353248 A    12/2000
(Continued)

OTHER PUBLICATIONS

"Hado," Time & Space Website, Available Online at https://time-space.kddi.com/digicul-column/suguyaru/20150326/, Mar. 26, 2015, Retrieved on Apr. 1, 2016, 6 pages. (Submitted with English Abstract as p. 1).

(Continued)

*Primary Examiner* — Michael J Jansen, II
(74) *Attorney, Agent, or Firm* — McCoy Russell LLP

(57) ABSTRACT

A game system 100 to which an image display system is applied contains a head-mounted display 300 having a camera for capturing a real world and a display for displaying video information obtained by integrating real-world video information captured by the capturing part with virtual-world video information, a motion sensor 400 for detecting movement of a body of a wearer wearing the head-mounted display 300 as movement information and a marker 200 used for detecting position information of the wearer. The game system 100 controls the virtual-world video information based on the movement information and the position information. According to this configuration, it (Continued)

is possible to control the video information displayed on the head-mounted display according to the position and the movement of the wearer. Further, the present invention provides a method for controlling the image display system, an image distribution system and a head-mounted display.

7 Claims, 8 Drawing Sheets

(51) Int. Cl.
    *G06F 1/16*     (2006.01)
    *G06F 3/0346*     (2013.01)

(52) U.S. Cl.
    CPC .......... *G06F 3/011* (2013.01); *G06F 3/0346* (2013.01); *G02B 2027/014* (2013.01); *G02B 2027/0138* (2013.01)

(58) Field of Classification Search
    CPC .............. G06T 19/006; G06T 7/70; G06T 7/20; G06T 13/40; G06T 2215/16; G06T 2210/21; G02B 27/017; G02B 2027/0178; G02B 27/0093; G02B 2027/0134; G02B 2027/0138; G02B 2027/014; G02B 27/0172; G02B 27/0176; A63F 13/40
See application file for complete search history.

(56) References Cited

U.S. PATENT DOCUMENTS

| | | | | |
|---|---|---|---|---|
| 6,972,734 | B1* | 12/2005 | Ohshima | A63F 13/10 345/8 |
| 8,243,099 | B2* | 8/2012 | Ryu | G06F 3/016 340/407.1 |
| 8,570,320 | B2* | 10/2013 | Izadi | G06T 17/00 345/420 |
| 8,944,928 | B2* | 2/2015 | Kaps | G06T 13/40 473/199 |
| 8,957,835 | B2* | 2/2015 | Hoellwarth | G02B 27/017 345/8 |
| 9,030,493 | B2* | 5/2015 | Hayakawa | A63F 13/06 345/633 |
| 9,122,053 | B2* | 9/2015 | Geisner | G02B 27/017 |
| 9,183,676 | B2* | 11/2015 | McCulloch | G06T 19/006 |
| 9,255,813 | B2* | 2/2016 | Liu | G06F 3/011 |
| 9,256,282 | B2* | 2/2016 | Latta | G06F 3/017 |
| 9,286,725 | B2* | 3/2016 | Vasquez, II | G06T 19/006 |
| 9,293,118 | B2* | 3/2016 | Matsui | G09G 5/377 |
| 9,696,795 | B2* | 7/2017 | Marcolina | G06F 3/011 |
| 9,710,057 | B2* | 7/2017 | Mikhailov | G06F 3/012 |
| 9,767,613 | B1* | 9/2017 | Bedikian | G06T 19/006 |
| 9,911,240 | B2* | 3/2018 | Bedikian | G06T 19/006 |
| 10,068,373 | B2* | 9/2018 | Lee | G06F 3/0488 |
| 10,203,762 | B2* | 2/2019 | Bradski | G02B 27/225 |
| 10,261,594 | B2* | 4/2019 | Marcolina | G06F 3/011 |
| 10,297,082 | B2* | 5/2019 | Wilson | G06T 19/006 |
| 2002/0084974 | A1* | 7/2002 | Ohshima | A63F 13/00 345/156 |
| 2009/0195538 | A1* | 8/2009 | Ryu | G06F 3/016 345/419 |
| 2010/0079356 | A1* | 4/2010 | Hoellwarth | G02B 27/017 345/8 |
| 2010/0241998 | A1* | 9/2010 | Latta | G06F 3/011 715/862 |
| 2012/0194517 | A1* | 8/2012 | Izadi | G06T 17/00 345/420 |
| 2012/0206452 | A1* | 8/2012 | Geisner | G02B 27/017 345/419 |
| 2012/0218300 | A1* | 8/2012 | Hayakawa | A63F 13/06 345/633 |
| 2013/0063432 | A1* | 3/2013 | Kaps | G06T 13/40 345/419 |
| 2013/0093788 | A1* | 4/2013 | Liu | G06F 3/011 345/633 |
| 2013/0257907 | A1* | 10/2013 | Matsui | G09G 5/377 345/633 |
| 2013/0286004 | A1* | 10/2013 | McCulloch | G06T 19/006 345/419 |
| 2014/0125698 | A1* | 5/2014 | Latta | G06F 3/011 345/633 |
| 2015/0130790 | A1* | 5/2015 | Vasquez, II | G06T 19/006 345/419 |
| 2015/0261291 | A1 | 9/2015 | Mikhailov et al. | |
| 2016/0005229 | A1* | 1/2016 | Lee | G06F 3/0488 345/419 |
| 2016/0026253 | A1* | 1/2016 | Bradski | G02B 27/225 345/8 |
| 2016/0033770 | A1* | 2/2016 | Fujimaki | G06T 19/006 345/8 |
| 2016/0098862 | A1* | 4/2016 | Wilson | G06T 19/006 345/419 |
| 2016/0184703 | A1* | 6/2016 | Brav | G06F 3/012 463/30 |
| 2016/0239080 | A1* | 8/2016 | Marcolina | G06F 3/011 |
| 2017/0235377 | A1* | 8/2017 | Marcolina | G06F 3/011 715/849 |
| 2017/0345218 | A1* | 11/2017 | Bedikian | G06T 19/006 |
| 2019/0025595 | A1* | 1/2019 | Fukuda | G06F 3/01 |

FOREIGN PATENT DOCUMENTS

| | | |
|---|---|---|
| JP | 2004038470 A | 2/2004 |
| JP | 2010257081 A | 11/2010 |
| JP | 2015049548 A | 3/2015 |
| JP | 2015226110 A | 12/2015 |
| WO | 2015192117 A1 | 12/2015 |
| WO | 2016028450 A1 | 2/2016 |

OTHER PUBLICATIONS

Tanabe, K., "Kamehame-ha," Toyo Keizai Website, Available Online at https://toyokeizai.net/articles/-/65790, Apr. 10, 2015, Retrieved on Apr. 1, 2016, 5 pages. (Submitted with English Abstract as p. 1).
ISA Japanese Patent Office, International Search Report Issued in Application No. PCT/JP2016/054459, dated Apr. 12, 2016, WIPO, 4 pages.
State, A. et al., "Superior Augmented Reality Registration by Integrating Landmark Tracking and Magnetic Tracking," Proceedings of the 23rd Annual Conference on Computer Graphics and Interactive Techniques (SIGGRAPH '96), Aug. 4, 1996, New Orleans, Louisiana, 10 pages.
European Patent Office, Partial Supplementary European Search Report Issued in Application No. 16884970.1, dated Dec. 4, 2018, Germany, 11 pages.
"[Microsoft Hololens] Project Xray, 3D Augmented Reality Game," Friendly Hyojoson hobby life Website, Available online at https://rgy0409.tistory.com/586, Oct. 11, 2015, 14 pages. (Submitted with Machine Translation).
Korean Intellectual Property Office, Office Action Issued in Application 10-2018-7020567, dated Apr. 26, 2019, 8 pages.
European Patent Office, Extended European Search Report Issued in Application No. 19152733.2, dated May 14, 2019, Germany, 8 pages.

* cited by examiner

IMAGE DISPLAY SYSTEM, METHOD FOR CONTROLLING IMAGE DISPLAY SYSTEM, IMAGE DISTRIBUTION SYSTEM AND HEAD-MOUNTED DISPLAY

CROSS-REFERENCE TO RELATED APPLICATIONS

The present application is a U.S. National Phase of International Patent Application Serial No. PCT/JP2016/054459 entitled "IMAGE DISPLAY SYSTEM, IMAGE DISPLAY SYSTEM CONTROL METHOD, IMAGE DISTRIBUTION SYSTEM, AND HEAD-MOUNTED DISPLAY," filed on Feb. 16, 2016. International Patent Application Serial No. PCT/JP2016/054459 claims priority to Japanese Patent Application No. 2016-006653, filed on Jan. 15, 2016. The entire contents of each of the abovementioned applications are hereby incorporated by reference in their entirety for all purposes.

FIELD OF THE INVENTION

The present invention relates to an image display system, a method for controlling the image display system, an image distribution system and a head-mounted display.

BACKGROUND ART

Conventionally, a head-mounted display (HMD) is known as a device which can integrate virtual-world video information into real-world video information in real time (for example, see patent document 1). However, although the head-mounted display of the patent document 1 can display the virtual-world video information, the head-mounted display of the patent document 1 cannot change this video information according to movement (in particular, movement of a hand or a leg) of a wearer wearing the head-mounted display or the like. Thus, it is difficult to improve an immersion feeling (presence feeling) of the wearer.

RELATED ART

Patent Document

Patent document 1: JP 2015-226110A

SUMMARY OF THE INVENTION

Problems to be Solved by the Invention

An object of the present invention is to provide an image display system and a method for controlling the image display system which can control video information displayed on a head-mounted display according to a position and movement of a wearer.

Means for Solving the Problems

The above object is achieved by the following present inventions.

(1) An image display system, comprising:
a head-mounted display having a capturing part for capturing a real world and an image display part for displaying video information obtained by integrating real-world video information captured by the capturing part with virtual-world video information;
a movement information detecting part for detecting movement of a body of a wearer wearing the head-mounted display as movement information; and a position information detecting part for detecting position information of the wearer, wherein the image display system controls the virtual-world video information based on the movement information and the position information.

(2) The image display system according to the above (1), wherein the position information detecting part can obtain the position information of the wearer by performing image recognition of a marker arranged in a space with using the capturing part.

(3) The image display system according to the above (1) or (2), wherein the position information detecting part can obtain three-dimensional position information of the wearer.

(4) The image display system according to any one of the above (1) to (3), wherein the movement information detecting part has a motion sensor to be worn by the wearer.

(5) The image display system according to the above (4), wherein the motion sensor is worn on an arm of the wearer.

(6) The image display system according to any one of the above (1) and (5), wherein the head-mounted display has a mobile terminal including the capturing part and the image display part and a frame which is worn on a head of the wearer and to which the mobile terminal is detachably attached.

(7) The image display system according to any one of the above (1) to (6), further comprising:
a capturing device for capturing an area in which the wearer exists, and an image display device for displaying an image obtained by integrating real-world video information captured by the capturing device with video information obtained by viewing the virtual-world video information displayed on the head-mounted display from a viewpoint of the capturing device.

(8) A method for controlling an image display system, the image display system containing a head-mounted display having a capturing part for capturing a real world and an image display part for displaying video information obtained by integrating real-world video information captured by the capturing part with virtual-world video information, a movement information detecting part for detecting movement of a body of a wearer wearing the head-mounted display as movement information and a position information detecting part for detecting position information of the wearer, the method comprising:
controlling the virtual-world video information based on the movement information and the position information.

(9) The method for controlling the image display system according to the above (8), wherein the image display system further has:
a capturing device for capturing an area in which the wearer exists, and an image display device for displaying video information, and wherein the image display system allows the image display device to display an image obtained by integrating real-world video information captured by the capturing device with video information obtained by viewing the virtual-world video information displayed on the head-mounted display from a viewpoint of the capturing device.

(10) An image distribution system, comprising:
a head-mounted display having a capturing part for capturing a real world and an image display part for displaying video information obtained by integrating real-world video information captured by the capturing part with virtual-world video information;

a movement information detecting part for detecting movement of a body of a wearer wearing the head-mounted display as movement information;

a position information detecting part for detecting position information of the wearer; and a capturing device for capturing an area in which the wearer exists, wherein the image distribution system is configured to control the virtual-world video information based on the movement information and the position information, and wherein the image distribution system distributes image information obtained by integrating real-world video information captured by the capturing device with video information obtained by viewing the virtual-world video information displayed on the head-mounted display from a viewpoint of the capturing device.

(11) A head-mounted display, comprising:

a mobile terminal including an image display part; and a frame for detachably supporting the mobile terminal, wherein the frame has:

a support portion for detachably supporting the mobile terminal at a position in front of eyes of a wearer with a posture in which the image display part is directed toward the side of the eyes of the wearer in a wearing-state that the head-mounted display is worn by the wearer, and window portions through which the wearer can see a real world, wherein the window portions are respectively arranged on at least the side of feet of the wearer in a space positioned between the eyes of the wearer and the mobile terminal attached to the support portion and a lateral side of the wearer in the space in the wearing-state.

Effects of the Invention

According to the present invention, since the virtual-world video information displayed on the head-mounted display can be controlled according to the position and the movement of the wearer, it is possible to improve convenience. Further, it is also possible to distribute a virtual video that the wearer is experiencing as a video viewed from a third party and thus the third part can also experience the virtual video together. Furthermore, it is also possible to provide the head-mounted display which can provide high safety.

DETAILED DESCRIPTION OF THE PREFERRED EMBODIMENTS

Hereinafter, detailed description will be given to an image display system and a method for controlling the image display system of the present invention based on the preferred embodiments shown in the accompanying drawings.

<First Embodiment>

First, description will be given to an image display system and a method for controlling the image display system according to a first embodiment of the present invention.

<First Embodiment>

Figure 1:
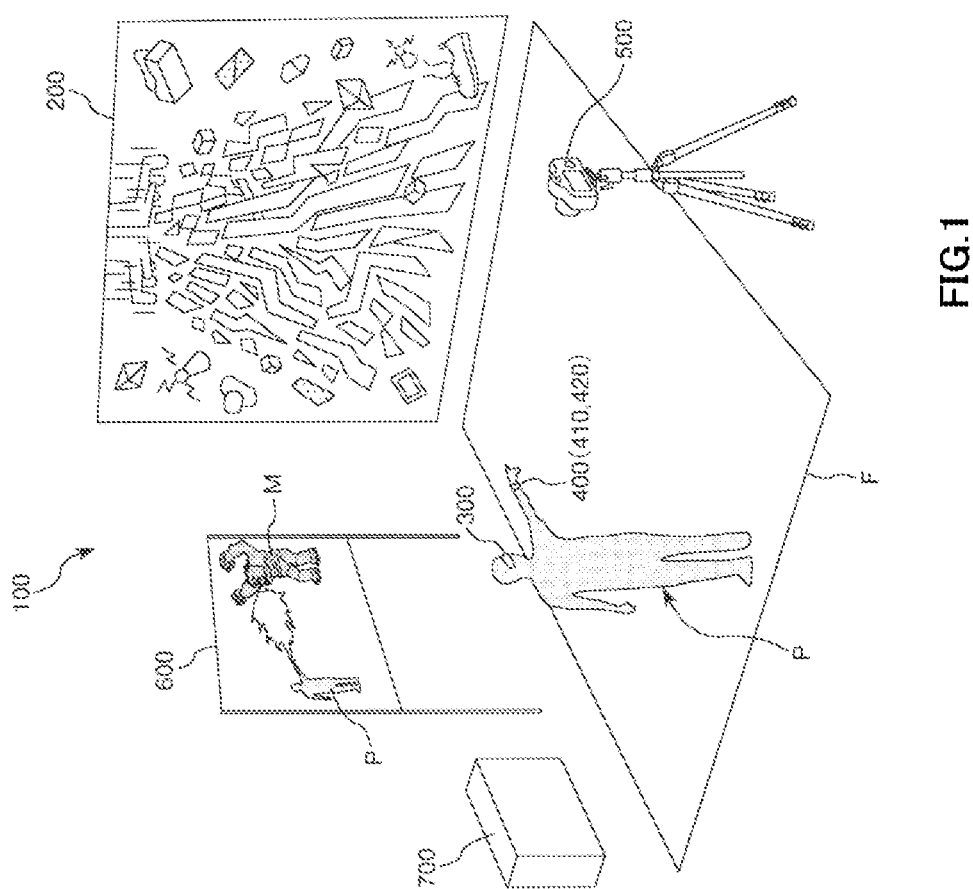
FIG. 1 is a configuration diagram showing a first embodiment of a game system to which an image display system and a method for controlling the image display system of the present invention are applied.
Figure 2:
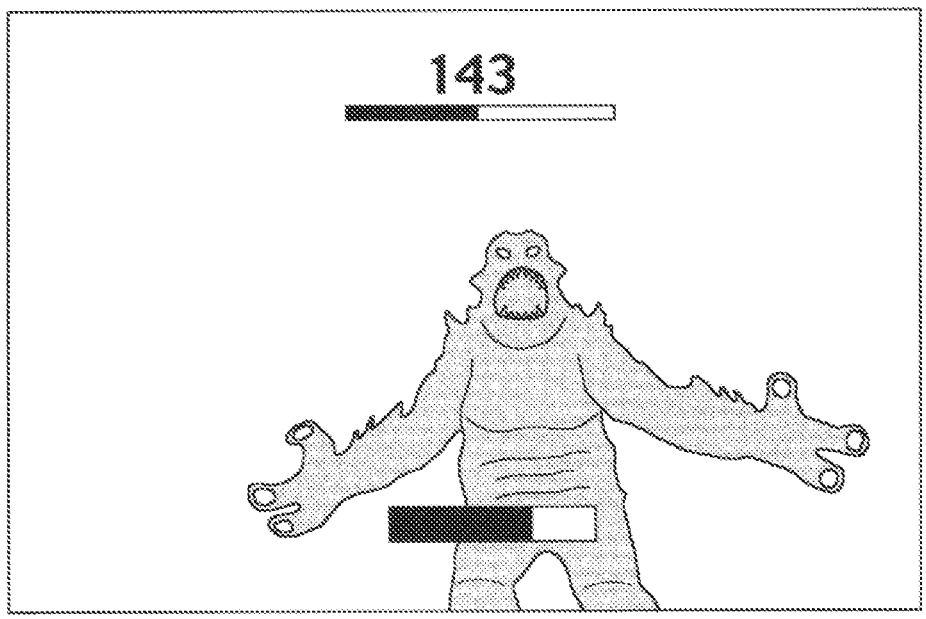
FIG. 2 is a view showing one example of an AR viewing field displayed on a head-mounted display.
Figure 3:
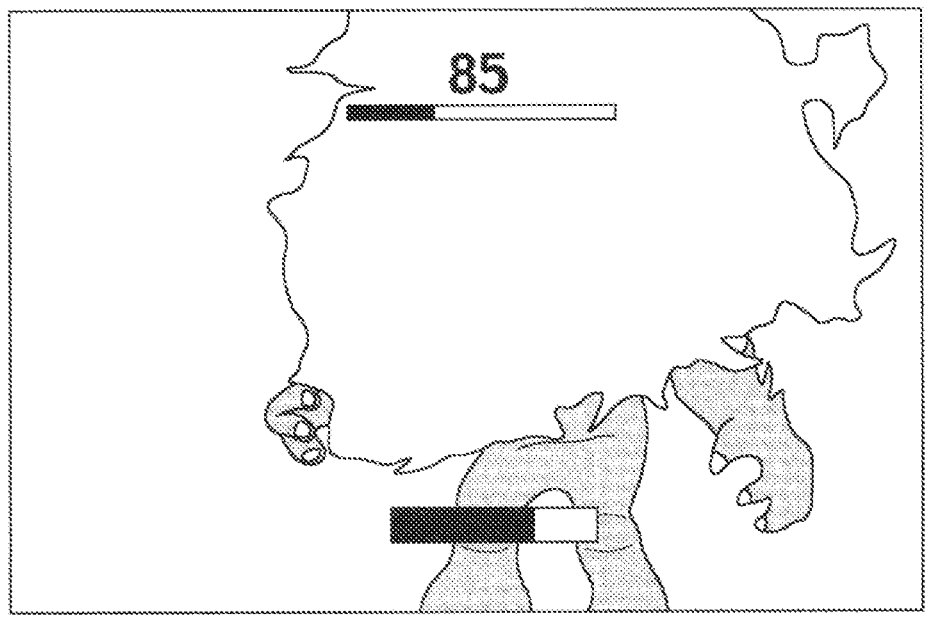
FIG. 3 is a view showing another example of the AR viewing field displayed on the head-mounted display.
Figure 4:
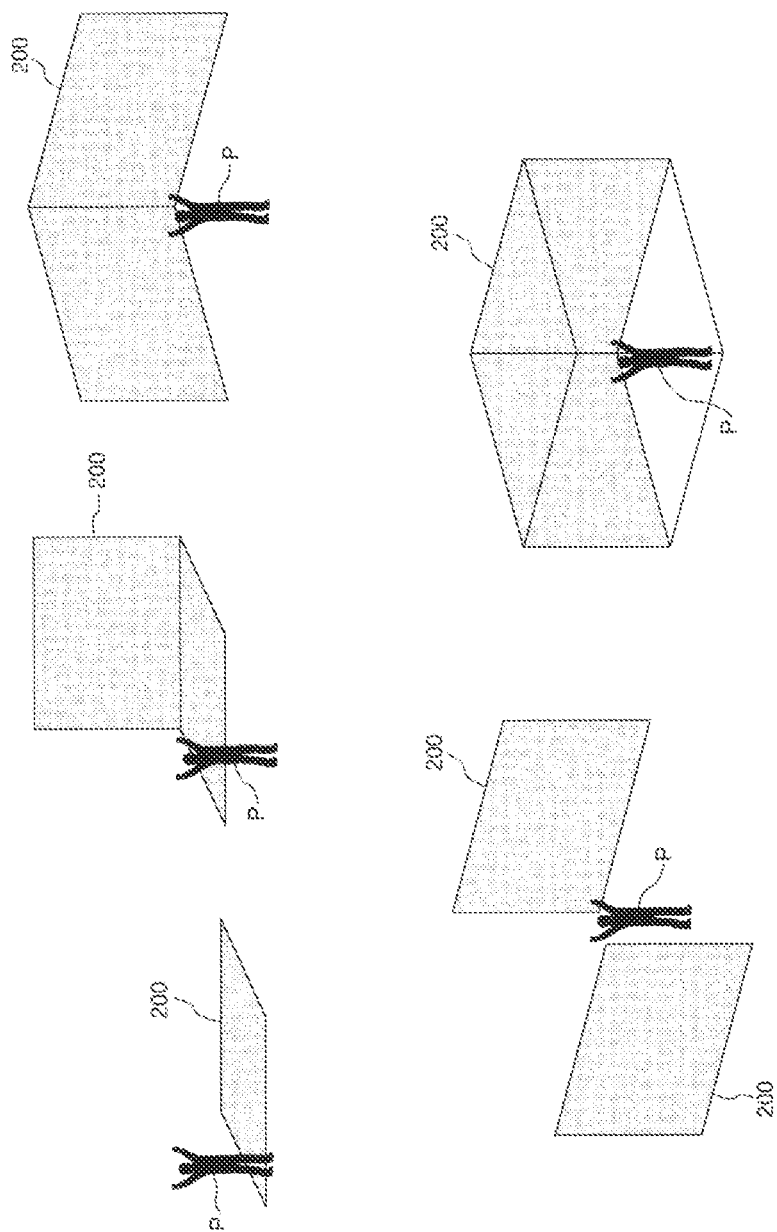
FIG. 4 is a view showing modified examples of an arrangement of a marker.
Figure 5:
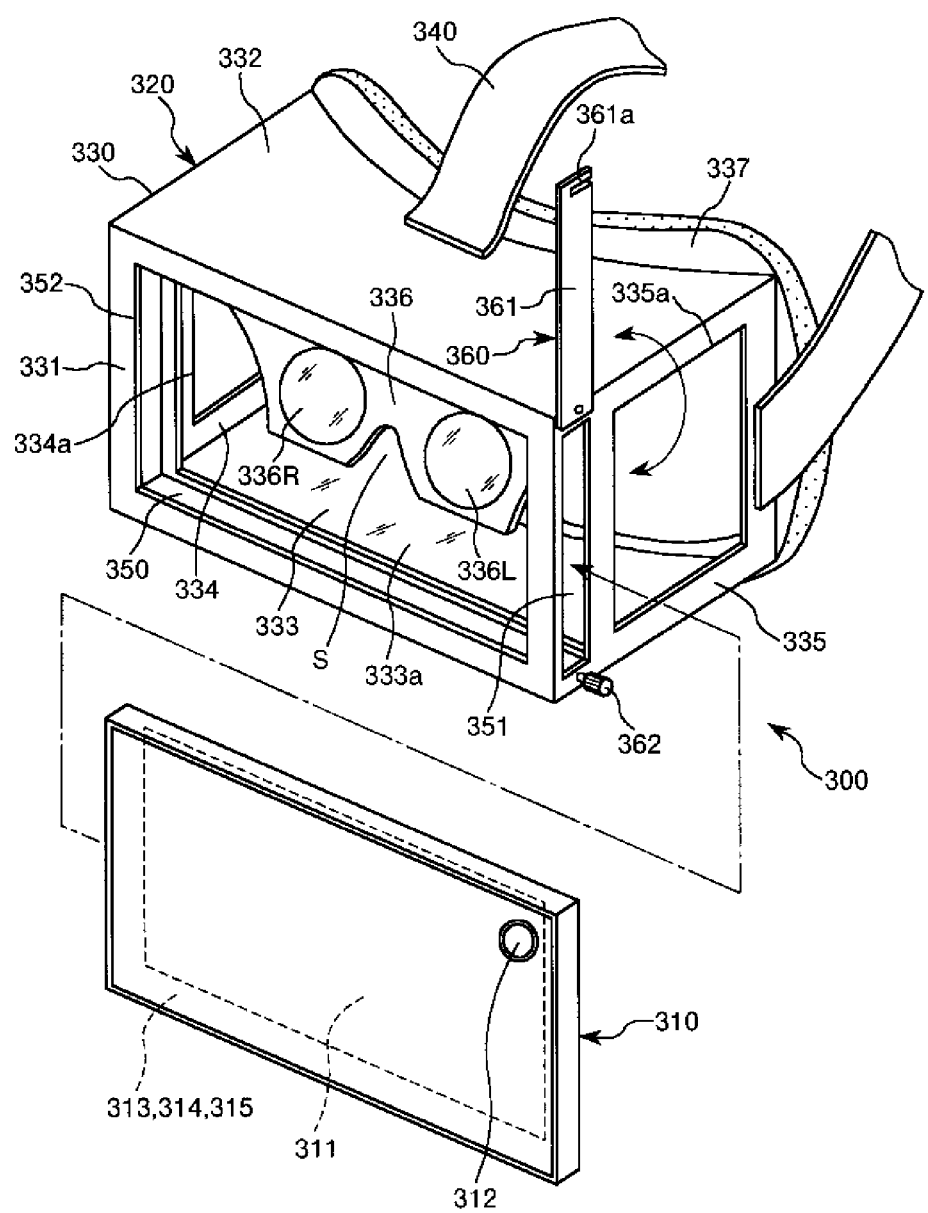
FIG. 5 is a perspective view showing the head-mounted display.
Figure 6:
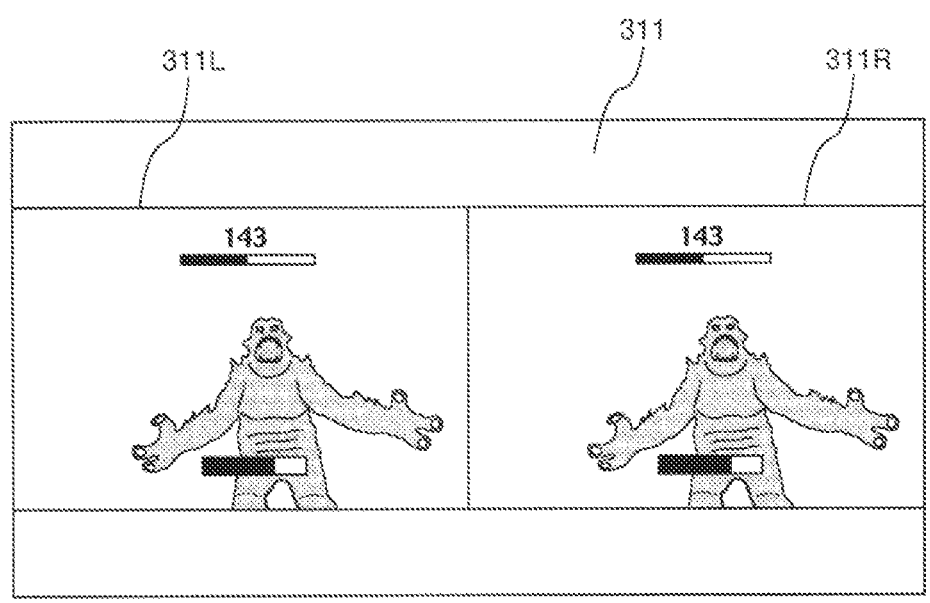
FIG. 6 is a view showing one example of an image displayed on a screen of a mobile terminal of the head-mounted display.
Figure 7:
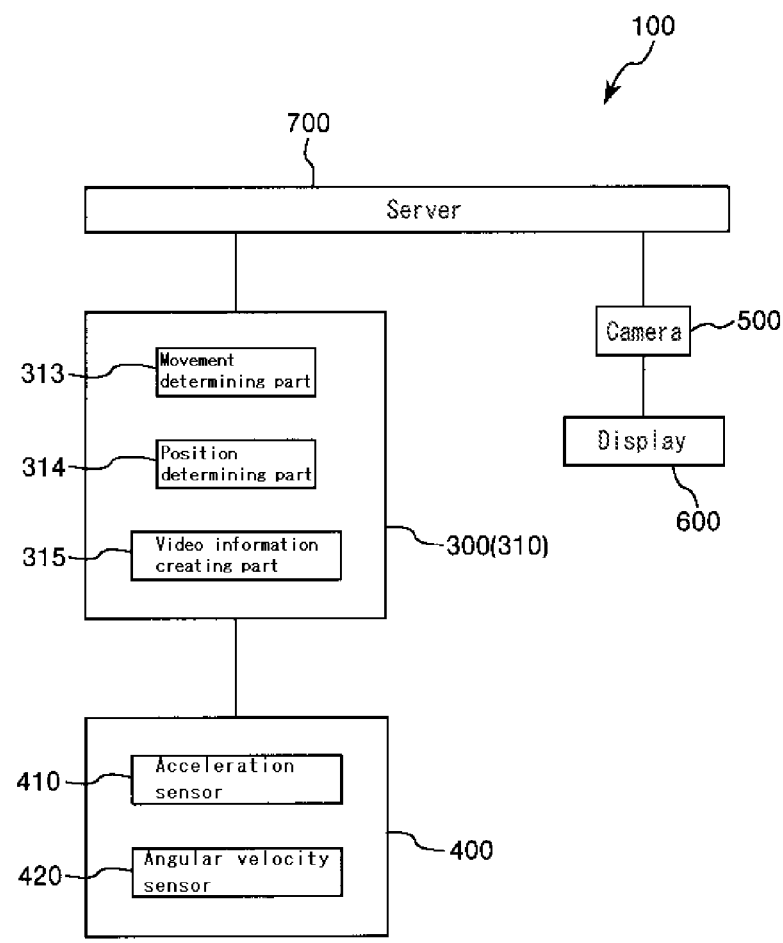
FIG. 7 is a block diagram of the game system shown in FIG. 1.

FIG. 1 is a configuration diagram showing a first embodiment of a game system to which the image display system and the method for controlling the image display system of the present invention are applied. Each of FIGS. 2 and 3 is a view showing one example of an AR viewing field displayed on a head-mounted display. FIG. 4 is a view showing modified examples of an arrangement of a marker. FIG. 5 is a perspective view showing the head-mounted display. FIG. 6 is a view showing one example of an image displayed on a screen of a mobile terminal of the head-mounted display. FIG. 7 is a block diagram of the game system shown in FIG. 1. In this regard, for the purpose of illustration, a graphical representation for a real world is omitted in each of FIGS. 2, 3 and 6.

As shown in FIG. 1, a game system 100 to which the image display system and the method for controlling the image display system of the present invention are applied mainly has a marker 200 arranged in a field F, a head-mounted display 300 and a motion sensor (a movement information detecting part) 400 which are worn by a player (a wearer) P, a camera (a capturing device) 500 for capturing the player P, a display (an image display device) 600 for displaying a video captured by the camera 500 and a server 700.

In the game system 100 as described above, a video obtained by integrating real-world video information with virtual-world video information is displayed on the head-mounted display 300 and the virtual-world video information is changed according to a position (position information) and movement (movement information) of the player P. Namely, the game system 100 is configured to control the virtual-world video information based on the position and the movement of the player P. Thus, according to the game system 100, it is possible to provide the player P with a body-sensitive AR (Augmented Reality).

Next, description will be given to one example of a game performed by using the game system 100. This game is a battle-type game for battling with a monster M. As shown in the AR viewing field (an image viewed by the player P) shown in FIG. 2, the monster M (the virtual-world video information) created from CGs (Computer Graphics) appears in front of eyes of the player P wearing the head-mounted display 300 (namely, the monster M appears in the real-world vide information viewed by the player P). The player P can move his/her own body to invoke commands (instructions) corresponding to his/her movement. Then, the player P can use the commands to battle with the monster M and the player P can win the battle with the monster M when a hit-point of the monster decreases to zero. Further, as shown in the AR viewing field shown in FIG. 3, attacking images of the player P and the monster M, hit-point images of the player P and the monster M and the like are visualized by the CGs during the battle. This makes it possible to give presence feeling to the battle with the monster M. In this regard, the commands are not particularly limited. Depending on game contents, examples of the commands include a command for attack (special skill attack, magic attack and the like), a command for defense (guard, avoidance, healing magic and the like) and a command for changing a weapon.

Further, the battle between the player P and the monster M is visualized as a video viewed from a viewpoint of the camera 500 by using the camera 500 and this created video is displayed on the display 600 as shown in FIG. 1. Thus, persons (galleries) other than the player P can also watch the battle between the player P and the monster M. This makes it possible to improve a sense of togetherness between the player P and the galleries. In this regard, the video displayed on the display 600 may be distributed to remote locations through the internet.

Hereinafter, each component contained in the game system 100 is described in sequence.

[Server]

The server 700 is a game engine for the game system 100 and has a function of performing game contents of the game system 100. Further, the server 700 is connected to the head-mounted display 300 and the camera 500 and thus information can be transmitted and received among them. In this regard, although a connection method to the server 700 may be a wired connection or a wireless connection, the head-mounted display 300 and the camera 500 are connected to the server 700 through the Wi-Fi (registered trademark) in this embodiment.

In this regard, although the server 700 is a so-called "physical server" located in the vicinity of the field F in this embodiment, the server 700 may be a so-called "virtual server" represented by a cloud server (a server on the web).

[Marker]

The marker 200 is positioned at the edge of the field F as shown in FIG. 1 and arranged on one substantially-vertical plane (for example, a wall surface of a room, a partition arranged in a room and the like). This marker 200 has a predetermined pattern. By performing image recognition of this pattern with a camera 312 provided in the head-mounted display 300, it is possible to obtain three-dimensional position information (information on a position and a posture) of the head-mounted display 300 (the player P)

In this regard, the pattern, the arrangement and the like of the marker 200 are not particularly limited as long as the image recognize of the marker 200 can be performed by using the camera 312 of the head-mounted display 300. The pattern, the arrangement and the like of the marker 200 can be appropriately selected depending on the intended use. For example, as shown in FIG. 4, the marker 200 may be arranged on a floor surface or arranged so as to cross over two or more surfaces (a wall surface, a floor surface and a ceiling surface) having different orientations. Further, the marker 200 may be a three-dimensional marker utilizing solid objects such as a structure and an ornament. Furthermore, for example, in a case of playing this game in a room, a shape itself of the room (in particular, a distinguishable portion such as a structure containing a pillar and a window and an interior accessory containing a painting and an illumination to which the image recognition can be easily performed) may be utilized as the marker 200. In this case, the shape of the room is scanned in advance and this scanned data may be used as the marker. Thus, this case has an advantage that it is not necessary to specially prepare the marker.

[Motion Sensor]

The motion sensor 400 is configured to be worn on an arm of the player P for detecting movement of the arm. An acceleration sensor 410 for detecting an acceleration and an angular velocity sensor 420 for detecting an angular velocity are built in the motion sensor 400 as described above. Detection signals (movement information) from the acceleration sensor 410 and the angular velocity sensor 420 are transmitted to the head-mounted display 300. Although a connection method between the motion sensor 400 and the head-mounted display 300 may be a wired method or a wireless method, the motion sensor 400 is connected to the head-mounted display 300 through the Bluetooth (registered trademark) in this embodiment.

In this regard, a configuration of the motion sensor 400 is not particularly limited as long as it can detect the movement of the arm. For example, the motion sensor 400 may further have a muscle potential sensor which can detect a muscle potential and use this muscle potential sensor to detect whether or not the hand of the player P is tightly gripped or detect movement of fingers (for example, rock, scissors and paper) and movement of a wrist (bending and stretching of the wrist, twist of the wrist). If the movement of the fingers can be detected as described above, it is possible to prepare more various commands than the above-mentioned commands and thus it is possible to perform the battle with a more precise manner. Further, although the motion sensor 400 is worn on the arm in this embodiment, a wearing part for the motion sensor 400 is not limited to the arm. For example, the wearing part may be a leg, a body, a head and the like. Furthermore, for example, motion sensors 400 may be respectively worn on both of the arms and the legs for each detecting movement of the arms and the legs. Further, the motion sensor 400 may not be worn on the body of the player P. For example, the motion sensor 400 may be built in a tool (for example, a sword-type tool and a bow-type tool as an imitation of a weapon) gripped by the player P, an attachment attached to the player P or the like.

Further, although the motion sensor is used as the movement information detecting part in this embodiment, the movement information detecting part is not limited to the motion sensor as long as it can detect the movement of the player P. For example, the movement information detecting part may take a configuration for detecting the movement of the player P with image recognition using a camera. Further, it may be possible to take a configuration in which an infrared depth sensor is used as the movement information detecting part and distance information from this infrared depth sensor is used for recognizing the player P to detect the movement of the body of the player P.

[Head-mounted Display]

As shown in FIG. 5, the head-mounted display 300 has a mobile terminal 310 and a frame 320 to which the mobile terminal 310 can be detachably attached.

The mobile terminal 310 has a screen (an image display part) 311 arranged on one surface (a front surface) thereof and the camera 312 (a capturing part 312) arranged on the other surface (a rear surface) thereof for capturing the real world on the side opposite to the screen 311. Although the mobile terminal 310 as described above is not particularly limited, a smartphone, a tablet terminal and the like can be used as the mobile terminal 310, for example. Further, a smartphone or the like owned by the player P can be used as the mobile terminal 310. Thus, it is possible to improve convenience of the head-mounted display 300.

On the other hand, the frame 320 has a frame main body 330 and a band 340 for fixing the frame main body 330 on the head of the player P. Further, the frame main body 330 has a box-like shape covering the eyes of the player P. In a state that the head-mounted display 300 is worn on the head, the frame main body 330 has a front portion 331 positioned in front of the eyes of the player P, an upper portion 332 positioned on the upper side, a lower portion 333 positioned on the lower side (the side of feet of the player P with respect to a space S positioned between the mobile terminal 310 and the eyes of the player P), lateral portions 334, 335 positioned on the lateral sides (left and right sides of the player P with respect to the space S) and a lens portion 336 positioned between the eyes and the front portion 331 (in the space S). Further, a shock-absorbing portion 337 made of sponge or the like is provided on a portion of the frame main body 330 contacting with the head.

Further, a slot portion (a support portion) 350 to which the mobile terminal 310 is attached and a lock mechanism 360 for fixing the mobile terminal 310 to the slot portion 350 are provided on the front portion 331.

The slot portion 350 can detachably support the mobile terminal 310. The slot portion 350 as described above has a slot port 351 provided on the lateral side of the front portion 331. The mobile terminal 310 can be inserted into the slot portion 350 through this slot port 351. Further, a window portion 352 for allowing the capturing of the camera 312 is provided in the slot portion 350. The window portion 352 of this embodiment is constituted of an aperture. The mobile terminal 310 is attached to the slot portion 350 as described above in a state that the screen 311 is directed toward the side of the eyes of the player P and the camera 312 is directed toward the front side of the player P.

On the other hand, the lock mechanism 360 can open and close the slot port 351 by pivotally moving a lock plate 361. The insertion of the mobile terminal 310 into the slot portion 350 is enabled by opening the slot port 351 and the mobile terminal 310 can be fixed to the slot portion 350 by closing the slot port 351. Further, by engaging a groove 361a provided in the lock plate 361 with a screw 362 provided on the lateral portion 335 and tightening the screw 362, it is possible to keep a state that the slot port 351 is closed.

Further, the upper portion 332 does not substantially transmit light and thus serves as a shade for blocking outside light (in particular, sun light and ceiling illumination light). By providing the upper portion 332 as described above, it becomes easier to see the image displayed on the screen 311 of the mobile terminal 310. On the other hand, each of the lower portion 333 and the lateral portions 334, 335 has a window portion through which light can pass. With this configuration, the player P can see (view) an external world (the real world) from the lower side and the lateral sides of the frame main body 330 through the window portions even in the wearing-state. Thus, safety in the wearing-state is improved. In this regard, the window portion of the lower portion 333 is constituted of a substantially colorless and transparent plate member 333a and the windows of the lateral portions 334, 335 are respectively constituted of apertures (through-holes) 334a, 335a in this embodiment. However, the configurations of the window portions are not particularly limited. For example, all of the window portions of the lower portion 333 and the lateral portions 334, 335 may be respectively constituted of apertures or constituted of colorless and transparent plate members. Further, a mirror member (a member which is considered as a mirror from a bright side (an outside) and considered as a transparent member through which the outside can be seen from a dark side (the player P side)) may be used instead of the colorless and transparent plate member.

Further, the lens portion 336 has a lens 336L for a left eye of the player P and a lens 336R for a right eye of the player P. With the lens portion 336 as described above, it is possible to enlarge the screen 311 of the mobile terminal 310 and display the enlarged screen 311.

In the head-mounted display 300 as described above, the real-world video information captured by the camera 312 is displayed on the screen 311 and the player P can see the real world spreading in front of the player P through the video displayed on the screen 311. Further, the virtual-world video information (the above-described monster M and commands) is integrated with the above-mentioned real-world video information in real time and this integrated vide information is displayed on the screen 311. With this configuration, it is possible to realize an AR with the head-mounted display 300.

In this embodiment, the screen 311 is divided into an image area 311L for the left eye and an image area 311R for the right eye as shown in FIG. 6 and the same image having no disparity is displayed on these image areas 311L, 311R to provide the player P with the video as a 2D plane vision image. However, for example, the virtual-world video image may be provided as a 3D stereoscopic vision image by displaying a stereo image having a disparity on the image areas 311L, 311R. Furthermore, for example, in a case where the mobile terminal 310 can create a pseudo 3D stereoscopic vision image from the video information from the camera 312 or in a case where the camera 312 is constituted of a stereo camera and can provide the 3D stereoscopic vision image, the real-world video information may be also provided as the 3D stereoscopic vision image by displaying the real-world video information as a stereo image.

Here, as shown in FIG. 7, the mobile terminal 310 has a movement determining part 313, a position determining part (a position information detecting part) 314 and a video information creating part 315.

The movement determining part 313 receives the detection signal (the movement information) from the motion sensor 400 and detects the movement of the arm of the player P from the received detection signal. Further, the movement determining part 313 determines whether or not the detected movement of the arm matches preliminarily registered movement of the arm and selects a command (instruction) corresponding to this movement of the arm if the movement matches the registered movement. A plurality of commands are registered in the movement determining part 313. For example, movement that the arms are crossed in front of the face corresponds to "defense", movement that the arm is quickly moved toward the front side corresponds to "attack", movement that the arm is quickly swung corresponds to "switch of weapon" and the like. In a case where the movement of the arm detected by the movement determining part 313 matches the registered "defense" command, the movement determining part 313 selects the "defense".

The position determining part 314 performs image recognition of the marker 200 by using the camera 312 to obtain a positional coordinate of the camera 312 which is based on the marker 200 as a reference. Specifically, image data of the marker 200 is registered in the mobile terminal 310 in advance. The position determining part 314 compares the registered image data and the image of the marker 200 captured by the camera 312 (in a point of a size, an orientation and the like) to calculate position information of the player P (the camera 312) with using a marker position as a point of origin. With this configuration, the three-dimensional position information of the player P can be obtained. Here, since the marker 200 registered in the mobile terminal 310 in advance is set so as to have a size and a position which are realistic with respect to field information (a position, a shape, a size and the like of the field F), it is possible to more accurately obtain the position information of the player P (the camera 312). Further, the position determining part 314 performs determination for an emission position of the skill (the magic) and determination for collision of the skill (determination whether or not the skill of the enemy reaches the player P) in real time based on the position information of the player P. Furthermore, the position determining part 314 allows a virtual object corresponding to the player P to follow the player P and uses this virtual object to perform the determination for the collision between the skill and the player P. Thus, it is possible to perform the determination for the collision with higher accuracy. In this regard, the virtual object is set to be colorless and transparent and thus the player P cannot see the virtual object on the screen 311.

In this regard, the position determining part 314 may take any configuration as long as it can obtain at least a two-dimensional positional coordinate of the player P.

The video information creating part 315 creates the virtual-world video information (the monster M, the skill, the magic and the like) which should be displayed on the screen 311 based on game information received from the server 700, the determination result of the movement determining part 313 and the position information obtained by the position determining part 314 and integrates the created video information with the real-world video information in real time to display this integrated video information on the screen 311.

Further, the video displayed on the screen is stored in the mobile terminal 310 and the server 700 and thus the player P can check the video after playing the game. Furthermore, the video may be displayed on the display 600 in real time or distributed to remote users (remote mobile terminals, remote personal computers and the like) from the server 700 through the internet. In this regard, it is preferable that this video is appropriately changed for the display 600 and the users. For example, since it is not necessary to divide the video for the display 600 into two screens for displaying the video on the display 600, it is preferable that the video for the display 600 is changed into a 2D plane vision image or a 3D stereoscopic vision image displayed on one screen.

Up to here, although the head-mounted display 300 has been described, the configuration of the head-mounted display 300 is not particularly limited as long as it has the above-described functions. For example, although each of the upper portion 332, the lower portion 333 and the lateral portions 334, 335 of the frame main body 330 has a flat plate-like shape and they are orthogonally connected to each other, each of these portions may be curved and connected to each other so as to form an oval shape as a whole. Further, connecting portions (corner portions) of the upper portion 332, the lower portion 333 and the lateral portions 334, 335 may be chamfered so as to have a curved shape. Furthermore, for example, although the head-mounted display 300 takes the configuration in which the mobile terminal 310 is utilized in this embodiment, the head-mounted display 300 may take a configuration in which the mobile terminal is not utilized. Namely, an optical transmissive type or video transmissive type head-mounted display in which the frame main body 330 has the image display function may be employed as the head-mounted display 300.

[Camera]

The camera 500 is fixedly arranged outside the field F so as to capture an entire area of the field F. Further, the camera 500 creates video information viewed from a viewpoint of the camera 500 by changing the virtual-world video information displayed on the head-mounted display 300 (that is the virtual-world information that the player P is experiencing) based on the various information such as the position information of the player P transmitted from the server 700 and the kinds of the commands (attack, defense and the like) selected by the player P. Then, the created video information is integrated with the real-world video information being captured by the camera 500 in real time to create a video for the galleries and this video for the galleries is displayed on the display 600.

In this regard, the video for the galleries created as described above is stored in the server 700 and the player P can check the video for the galleries after playing the game. Further, the video for the galleries can be distributed to remote terminals (remote users) from the server 700 through the internet. Thus, it is possible to watch the play of the player P even in remote locations to experience the game together.

The camera 500 as described above is not particularly limited. For example, a mobile terminal (such as a smartphone and a tablet terminal) having a camera function is used as the camera 500. By using such a mobile terminal, it is possible to create the virtual-world video information in the mobile terminal in the same manner as the above-described mobile terminal 310 and easily perform communication with the server 700, thereby simplifying the system configuration. Further, a digital still camera, a digital video camera and the like (hereinafter, referred to as "digital camera") can be used as the camera 500, for example. In this case, the digital camera is connected to a personal computer and the creation for the virtual-world video information and the communication with the server 700 as described above are performed by the personal computer. By using the digital camera, it is possible to improve image quality since there is a case where the capturing with higher resolution and the higher number of frames can be performed compared with the mobile terminal.

In this regard, although the camera 500 is arranged outside the field F in this embodiment, the arrangement of the camera 500 is not limited thereto. For example, the camera 500 may be arranged in the field F or the camera 500 may be arranged above the field F (an upper space with respect to the field F) by suspending the camera 500 from a ceiling, for example. Further, although the camera 500 is fixed in this embodiment, the camera 500 may be arranged so that the camera 500 can be moved. By arranging the camera 500 so that the camera 500 can be moved, it is possible to capture a video following to the movement of the player P, thereby more improving the presence feeling of the video displayed on the display 600.

[Display]

The display 600 is a display for the galleries (persons other than the player P) and arranged in the vicinity of the field F, for example. As described above, the video for the galleries (the video obtained by integrating the real-world video information captured by the camera 500 with the video information from the viewpoint of the camera 500 created by changing the virtual-world video information displayed on the head-mounted display 300) is displayed on this display 600. By arranging the display 600 as described above, the galleries can also experience the AR that the player P is experiencing, thereby improving the presence feeling of the game.

In this regard, although the image displayed on the display 600 may be a 2D plane vision image or a 3D stereoscopic vision image, the 2D plane vision image is displayed on the display 600 in this embodiment.

Further, the display 600 is not particularly limited as long as it can display an image. For example, the display 600 may take a configuration in which an image is projected on a screen or a wall surface by a projector. Further, a mobile terminal (a smartphone, a tablet terminal and the like) of each gallery may be used as the display 600. In this case, the video is distributed to the mobile terminal of each gallery from the server 700.

Up to here, the game system 100 has been described. In this regard, although the case where one player P plays the game has been described in this embodiment, the number of players P is not particularly limited to one. The number of the players P may be two or more and the two or more players P may battle with the monster M in cooperation with each other. In this case, the head-mounted display 300 (the mobile terminal 310) worn by each player P is configured to receive various information (the position information, the movement information and the like) of other players P. In addition to the monster M and the commands self-selected by each player P, the commands selected by the other players P are also displayed on the head-mounted display 300 worn by each player P as the video.

<Second Embodiment>

Next, description will be given to an image display system and a method for controlling the image display system according to a second embodiment of the present invention.

<Second Embodiment>

Figure 8:
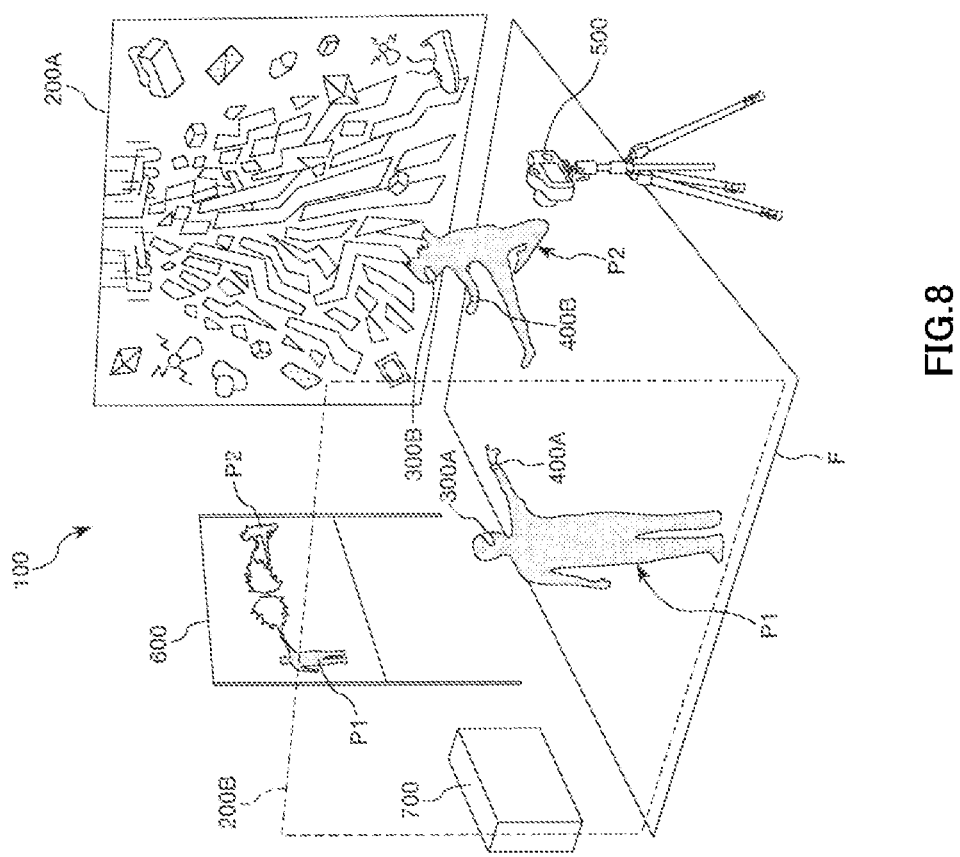
FIG. 8 is a configuration diagram showing a second embodiment of the game system to which the image display system and the method for controlling the image display system of the present invention are applied.
Figure 9:
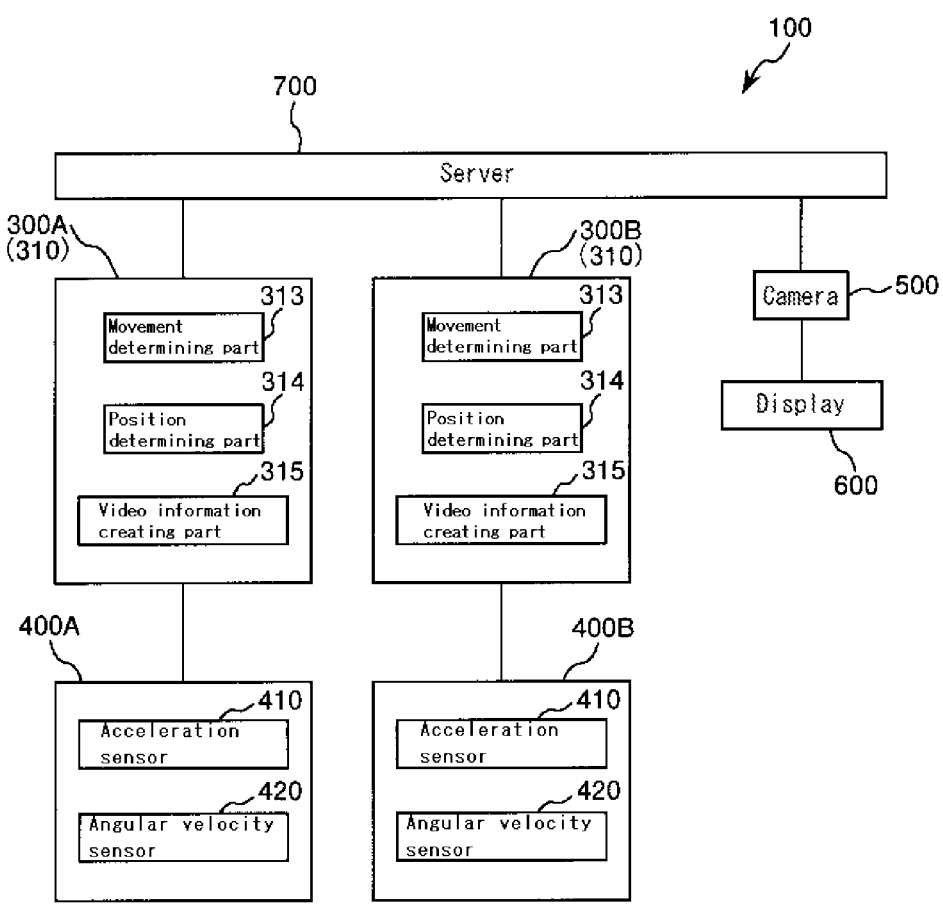
FIG. 9 is a block diagram of the game system shown in FIG. 8.

FIG. 8 is a configuration diagram showing the second embodiment of the game system to which the image display system and the method for controlling the image display system of the present invention are applied. FIG. 9 is a block diagram of the game system shown in FIG. 8.

<Second Embodiment>

Hereinafter, the image display system and the method for controlling the image display system according to the second embodiment of the present invention will be described by placing emphasis on the points differing from the above-described embodiment, with the same matters being omitted from the description.

The image display system and the method for controlling the image display system according to the second embodiment have the same configurations as those of the above-described first embodiment except that the game contents are modified. In this regard, the same reference numbers are added to the same components as those of the above-described embodiment.

As shown in FIGS. 8 and 9, the game system 100 of this embodiment mainly has a pair of markers 200A, 200B arranged in the field F, a head-mounted display 300A and a motion sensor 400A worn by a first player P1, a head-mounted display 300B and a motion sensor 400B worn by a second player P2, the camera 500 for capturing the first player P1 and the second player P2, the display 600 for displaying the video captured by the camera 500 and the server 700.

A game performed by using the game system 100 of this embodiment is a battle-type game in which the first player P1 and the second player P2 battle with each other. The first player P1 and the second player P2 are positioned so as to face each other and each player P1, P2 moves his/her body to attack the opponent player or defend against attack from the opponent player for the battle. The commands invoked by each player P1, P2 are visualized by CGs and displayed on the head-mounted displays 300A, 300B respectively worn by the players P1, P2. Further, the battle between the first player P1 and the second player P2 is visualized by the camera 500 and this video is displayed on the display 600.

[Markers]

The markers 200A, 200B are respectively arranged at both ends of the field F so as to face each other. Further, the marker 200A is arranged on the front side of the first player P1 (the rear side of the second player P2) and used as a marker for obtaining the position information of the first player P1. On the other hand, the marker 200B is arranged on the front side of the second player P2 (the rear side of the first player P1) and used as a marker for obtaining the position information of the second player P2. In this regard, each of the markers 200A, 200B has the same configuration as the marker 200 explained in the above-described first embodiment. Further, the arrangements of the markers 200A, 200B are not limited to the above-described arrangements as long as they can respectively obtain the position information of the first player P1 and the second player P2 (for example, see FIG. 4).

[Motion Sensors]

The motion sensor 400A is worn on an arm of the first player P1 and a detection signal of the motion sensor 400A is transmitted to the head-mounted display 300A worn by the first player P1. Further, the motion sensor 400B is worn on an arm of the second player P2 and a detection signal of the motion sensor 400B is transmitted to the head-mounted display 300B worn by the second player P2. In this regard, each of the motion sensors 400A, 400B has the same configuration as the motion sensor 400 explained in the above-described first embodiment.

[Head-mounted Displays]

The head-mounted display 300A performs image recognition of the marker 200A to obtain the position information of the first player P1. Further, the head-mounted display 300A detects movement of the arm of the first player P1 based on the detection signal from the motion sensor 400A and selects the commands corresponding to the detected movement of the arm. Then, the head-mounted display 300A creates virtual-world video information based on the position information of the first player P1, the commands selected by the first player P1 and various information (the game information, the position information of the second player P2, the commands selected by the second player P2 and the like) received from the server 700 and integrates the created video information with the real-world video information in real time to display this integrated vide information.

On the other hand, the head-mounted display 300B performs image recognition of the marker 200B to obtain the position information of the second player P2. Further, the head-mounted display 300B detects movement of the arm of the player P2 based on the detection signal from the motion sensor 400B and selects the commands corresponding to the detected movement of the arm. Then, the head-mounted display 300B creates virtual-world video information based on the position information of the first player P2, the commands selected by the first player P2 and various information (the game information, the position information of the first player P1, the commands selected by the first player P1 and the like) received from the server 700 and integrates the created video information with the real-world video information in real time to display this integrated vide information.

Each of the head-mounted displays 300A, 300B as described above has the same configuration as the head-mounted display explained in the above-described first embodiment.

Up to here, the second embodiment has been described. Although the one-to-one battle-type game system 100 has been described in this embodiment, the number of the players is not particularly limited. The battle style of the game system 100 may be a many-to-many style such as a two-to-two style, a three-to-three style.

Up to here, although the image display system, the method for controlling the image display system, the image distribution system and the head-mounted display of the present invention have been described based on the embodiments illustrated in the drawings, the present invention is not limited thereto. The configuration of each component can be replaced with an arbitrary configuration having the same function. Further, other arbitrary components may be added to the present invention. Further, the embodiments may be appropriately combined with each other.

Further, although the configuration in which the image display system, the method for controlling the image display system, the image distribution system and the head-mounted display are applied to the game system has been described in the above-described embodiments, the field to which the image display system and the method for controlling the image display system are applied is not limited to the game field. For example, the image display system and the method for controlling the image display system may be applied to a design simulation for home electronics, a car, an airplane and the like.

INDUSTRIAL APPLICABILITY

The game system 100 to which the image display system of the present invention is applied contains the head-mounted display 300 having the camera for capturing the real-world and the display for displaying the video information obtained by integrating the real-world video information captured by this camera with the virtual-world video information, the motion sensor 400 for detecting the movement of the body of the wearer wearing the head-mounted display 300 as the movement information and the marker 200 used for detecting the position information of the wearer. The game system 100 controls the virtual-world video information based on the movement information and the position information. According to this configuration, it is possible to control the video information displayed on the head-mounted display according to the position and the movement of the wearer. For the reason stated above, the present invention has industrial applicability.

DESCRIPTION OF REFERENCE SIGNS

100 . . . Game system; 200, 200A, 200B . . . Marker; 300, 300A, 300B . . . Head-mounted display; 310 . . . Mobile terminal; 311 . . . Screen; 311L, 311R . . . Image area; 312 . . . Camera; 313 . . . Movement determining part; 314 . . . Position determining part; 315 . . . Video information creating part; 320 . . . Frame; 330 . . . Frame main body; 331 . . . Front portion; 332 . . . Upper portion; 333 . . . Lower portion; 333*a* . . . Plate member; 334, 335 . . . Lateral portion; 334*a*, 335*a* . . . Aperture; 336 . . . Lens portion; 336L, 336R . . . Lens; 337 . . . Shock-absorbing portion; 340 . . . Band; 350 . . . Slot portion; 351 . . . Slot port; 352 . . . Window portion; 360 . . . Lock mechanism; 361 . . . Lock plate; 361*a* . . . Groove; 362 . . . Screw; 400, 400A, 400B . . . Motion sensor; 410 . . . Acceleration sensor; 420 . . . Angular velocity sensor; 500 . . . Camera; 600 . . . Display; 700 . . . Server; F . . . Field; M . . . Monster; P . . . Player; P1 . . . First player; P2 . . . Second player; S . . . Space

What is claimed is:

1. An image display system, comprising:
   a head-mounted display having a capturing part for obtaining first real-world video information by capturing a real world and an image display part for displaying first video obtained by integrating the first real-world video information captured by the capturing part with first virtual-world video information;
   a movement information detecting part for detecting movement of a body of a wearer wearing the head-mounted display as movement information;
   a position information detecting part for detecting position information of the wearer;
   a capturing device which is fixedly arranged outside a predetermined field in which the wearer can experience an augmented reality provided by the image display system and configured to capture the predetermined field in which the wearer exists to obtain second real-world video information; and
   an image display device for displaying second video obtained by integrating the second real-world video information obtained by the capturing device with second virtual-world video information obtained by viewing the first virtual-world video information from a viewpoint of the capturing device which is different from a viewpoint of the wearer,
   wherein the image display system is configured to control the first virtual-world video information and the second virtual-world video information based on the movement information and the position information, and
   wherein the position information detecting part obtains the position information of the wearer by performing image recognition of a marker arranged in a space using the capturing part of the head-mounted display, allows a virtual object corresponding to the wearer to follow the wearer based on the obtained position information and uses the virtual object to perform determination for collision with the wearer, and
   the second video displayed on the image display device is different from the first video displayed on the image display part of the head-mounted display.

2. The image display system as claimed in claim 1, wherein the position information detecting part can obtain three-dimensional position information of the wearer.

3. The image display system as claimed in claim 1, wherein the movement information detecting part has a motion sensor to be worn by the wearer.

4. The image display system as claimed in claim 3, wherein the motion sensor is worn on an arm of the wearer.

5. The image display system as claimed in claim 1, wherein the head-mounted display has a mobile terminal including the capturing part and the image display part and a frame which is worn on a head of the wearer and to which the mobile terminal is detachably attached.

6. A method for controlling an image display system, the image display system containing a head-mounted display having a capturing part for obtaining first real-world video information by capturing a real world and an image display part for displaying first video obtained by integrating the first real-world video information captured by the capturing part with first virtual-world video information, a movement information detecting part for detecting movement of a body of a wearer wearing the head-mounted display as movement information, a position information detecting part for detecting position information of the wearer, a capturing device which is fixedly arranged outside a predetermined field in which the wearer can experience an augmented reality provided by the image display system and configured to capture the predetermined field in which the wearer exists to obtain second real-world video information and an image display device for displaying second video, wherein the image display system allows the image display device to display the second video obtained by integrating second real-world video information obtained by the capturing device with second virtual-world video information obtained by viewing the first virtual-world video information from a viewpoint of the capturing device which is different from a viewpoint of the wearer, the image display system configured to control the first virtual-world video information and the second virtual-world video information based on the movement information, the position information detecting part obtains the position information of the wearer by performing image recognition of a marker arranged in a space using the capturing part of the head-mounted display, allows a virtual object corresponding to the wearer to follow the wearer based on the obtained position information and uses the virtual object to perform determination for collision with the wearer, and the second video displayed on the image display device is different from the first video displayed on the image display part of the head-mounted display.

7. An image distribution system using an image display system, the image display system containing:

a head-mounted display having a capturing part for obtaining first real-world video information by capturing a real world and an image display part for displaying first video obtained by integrating the first real-world video information captured by the capturing part with first virtual-world video information;

a movement information detecting part for detecting movement of a body of a wearer wearing the head-mounted display as movement information;

a position information detecting part for detecting position information of the wearer; and a capturing device which is fixedly arranged outside a predetermined field in which the wearer can experience an augmented reality provided by the image display system and configured to capture the predetermined field in which the wearer exists to obtain second real-world video information, and wherein the image distribution system distributes second video obtained by integrating the second real-world video information obtained by the capturing device with second virtual-world video information obtained by viewing the first virtual-world video information from a viewpoint of the capturing device which is different from a viewpoint of the wearer, the image display system is configured to control the first virtual-world video information and the second virtual-world video information based on the movement information and the position information, the position information detecting part obtains the position information of the wearer by performing image recognition of a marker arranged in a space using the capturing part of the head-mounted display, allows a virtual object corresponding to the wearer to follow the wearer based on the obtained position information and uses the virtual object to perform determination for collision with the wearer, and the distributed second video is different from the first video displayed on the image display part of the head-mounted display.

* * * * *